Patented Feb. 6, 1940

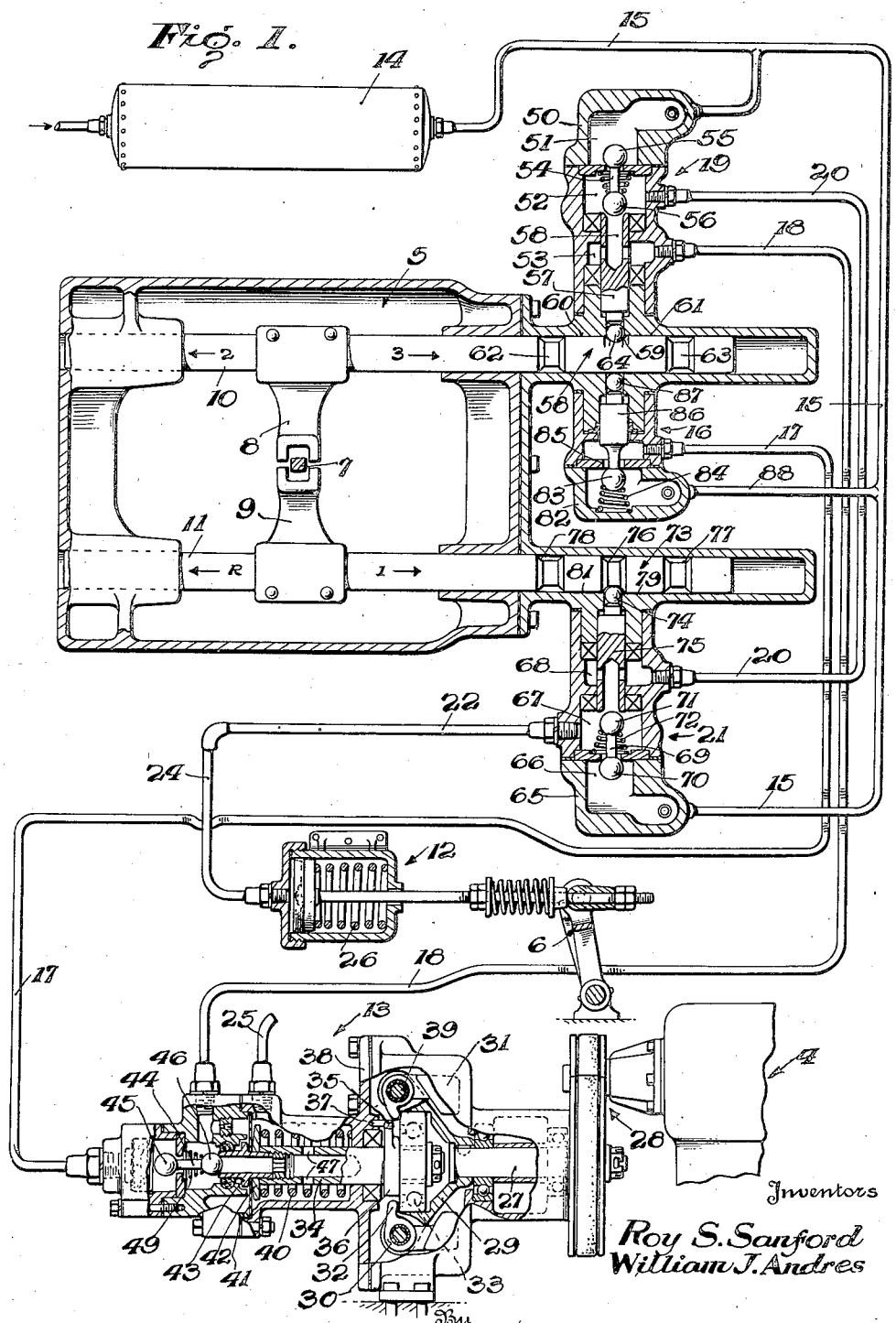

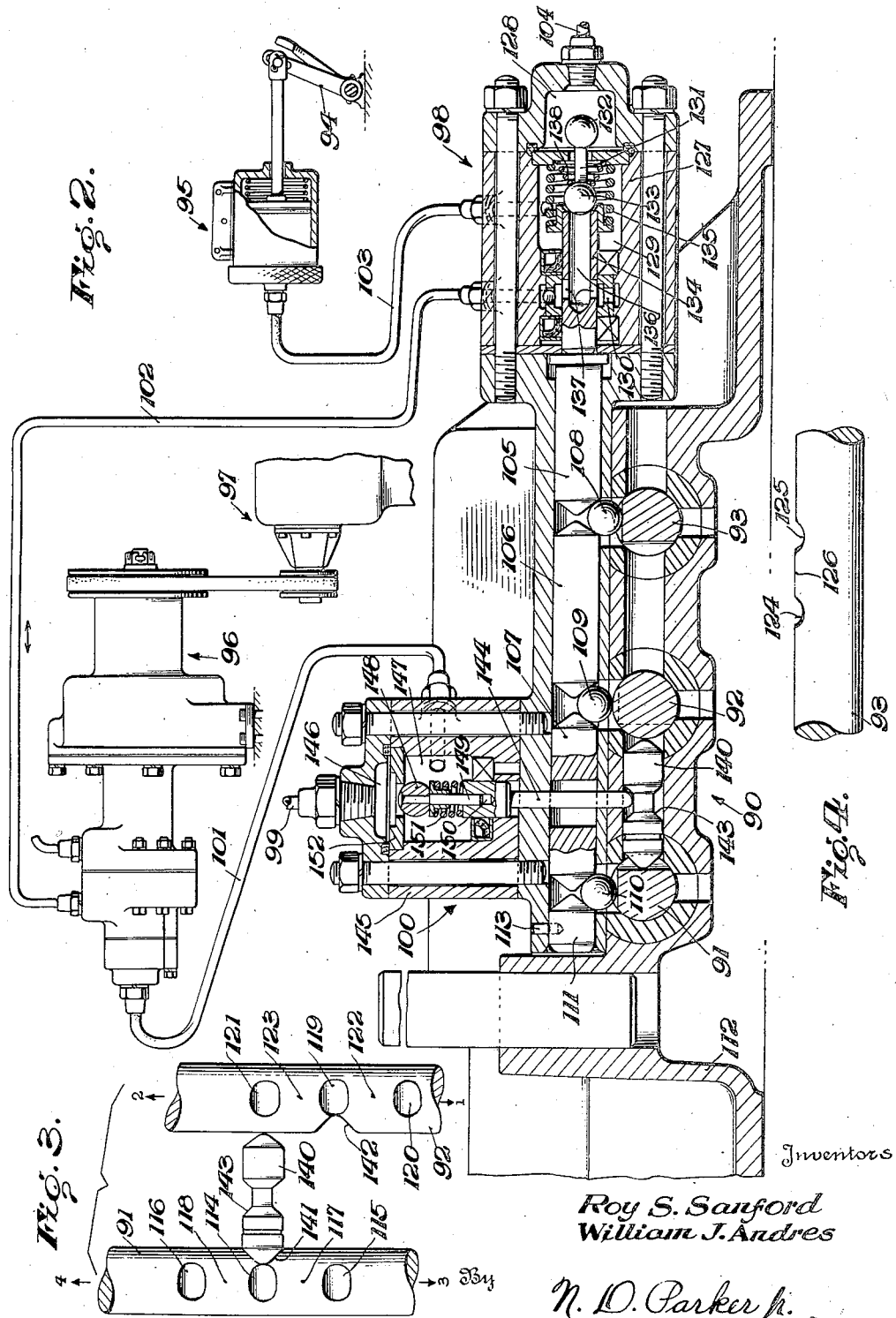

2,189,681

UNITED STATES PATENT OFFICE 2,189,681

GEAR SHIFT MECHANISM

Roy S. Sanford and William J. Andres, Pittsburgh, Pa., assignors to Bendix-Westinghouse Automotive Air Brake Company, Pittsburgh, Pa., a corporation of Delaware Application October 28, 1937, Serial No. 171,569

15 Claims. (Cl. 192—3.5)

This invention relates to motor vehicle control mechanisms and more particularly to a mechanism enabling coordinated control of the vehicle transmission and clutch.

One of the objects of the present invention is to provide a novel and simplified arrangement for shifting the gears of an automotive transmission and for automatically controlling the vehicle clutch.

Another object is to provide, in a vehicle gear-shifting mechanism, a novel arrangement for automatically controlling the vehicle clutch by movement of said mechanism, the arrangement being such that engagement of the clutch is controlled by the speed of the vehicle engine.

Still another object is to provide, in a mechanism of the above character, a novel arrangement insuring disengagement of the clutch whenever the transmission is actuated to change gears and wherein engine-controlled means are utilized for controlling clutch engagement.

A further object comprehends a power-operated clutch control mechanism associated with a gear-shifting device in such manner that clutch engagement is controlled by a speed-responsive device, while clutch disengagement is dependent upon the speed-responsive device when the transmission is employed for establishing certain gear relations.

Other objects and novel features of the invention will appear more fully hereinafter from the following detailed description when taken in connection with the accompanying drawings illustrating two embodiments of the invention. It is to be expressly understood, however, that the drawings are employed for purposes of illustration only and are not designed as a definition of the limits of the invention, reference being had for this latter purpose to the appended claims.

In the drawings, wherein similar reference characters refer to similar parts throughout the several views:

Fig. 1 is a diagrammatic view, partly in section, of a motor vehicle-controlling mechanism constructed in accordance with the principles of the present invention;

Fig. 2 is a diagrammatic view, partly in section, of a modified form of controlling mechanism;

Fig. 3 is a partial plan view of a pair of shift rails utilized in connection with the mechanism of Fig. 2; and F.g. 4 is a partial plan view of the shift rail of Fig. 2 employed for establishing reverse gear relation.

Referring more particularly to Fig. 1, the present invention is illustrated therein in connection with a motor vehicle having an engine 4, a ratio-changing transmission 5 and a clutch-controlling member 6. The transmission is adapted to be manually operated through movement of a lever 7 which may selectively engage one or the other of members 8 or 9 respectively carried by shift rails 10 and 11. The latter are associated with the ratio-changing gearing of the transmission in a manner well known in the art, it being desired to point out that, in the illustrated form, movement of the shift rail 10 to the left and right, as shown in Fig. 1, respectively establishes second and third gear ratio, while corresponding movement of the shift rail 11 respectively establishes reverse or first gear ratio. The clutch-controlling member 6 is adapted to be operated by a fluid motor 12 and the construction is such that, during operation of the gear-shifting mechanism, the clutch-controlling member 6 will be automatically controlled to the end that the vehicle clutch may be efficiently engaged and disengaged in proper sequence with changes in the transmission gear ratio.

Means are provided for controlling the clutch-engaging and disengaging movements of clutch-controlling member 6 during changes in the transmission gear ratios, and, preferably, such means are so constructed that the clutch is disengaged when the engine 4 is idling and is permitted to engage when the engine speed is gradually increased. As shown, such means include a centrifugally-controlled valvular mechanism 13 which is preferably constructed in accordance with the application of Roy S. Sanford, Serial No. 171,570, filed October 28, 1937, for Vehicle control mechanism. With the engine 4 idling, the valvular mechanism 13 serves to conduct fluid pressure from a reservoir 14 to the clutch motor 12 by way of conduit 15, valve 16, conduit 17, valvular mechanism 13, conduit 18, valvular mechanism 19, conduit 20, valvular mechanism 21, and conduits 22 and 24. When the speed of the engine 4 is increased above idling speed, valvular mechanism 13 operates in such a manner as to exhaust the fluid from the clutch motor 12 through conduit 24, conduit 22, valvular mechanism 21, conduit 20, valvular mechanism 19, conduit 18 and an exhaust conduit 25, and the construction is such that the fluid pressure is gradually exhausted, thus permitting the vehicle clutch to be smoothly engaged through the action of the usual clutch return springs associated therewith, aided by a return spring 26 housed within the clutch motor 12.

Referring more particularly to the centrifugally-operated valvular mechanism 13, the same includes a shaft 27 drivably connected at one end with the engine through a belt and pulley drive 28, the other end of the shaft having a rotor 29 secured thereto and provided with a plurality of centrifugally-actuated levers 30. The levers 30 include a weighted arm 31 and an actuating arm 32, the latter being adapted to cooperate with a bearing 33 which is capable of a limited sliding movement with respect to the rotor. Bearing 33 is adapted to pilot at one end a valve-actuating member 34, and the latter is maintained in a non-rotatable condition as by means of an extension 35 provided on a collar 36, the said extension embracing a stud 37 carried by a casing 38 of the valvular mechanism 13. From this construction, it will be readily perceived that, as the speed of the rotor 29 increases, centrifugal force will effect a movement of levers 30 about pivot pins 39 in order to cause arms 32 to move bearing 33 and valve-actuating member 34 to the right, as viewed in Fig. 1. The latter member is normally urged toward the left, as viewed in this figure, through a spring 40, confined between a portion of the casing 38 and a diaphragm 41 secured to member 34 as by means of elements 42 and 43.

The valvular mechanism 13, in addition to the centrifugally-operated actuating device heretofore described, also includes a valve structure comprising a valve 44 provided with intake and exhaust heads 45 and 46 respectively, the intake head, when open, serving to connect conduits 17 and 18 and the exhaust valve head 46, when open, serving to connect conduits 18 and 25. This latter connection includes a plurality of ports 47 positioned in the member 34 and also includes the member 43 which is hollow and is adapted to form, at its left-hand extremity, a seat for the exhaust valve head 46. The valve 44 has associated therewith a spring 49 which constantly tends to seat the intake valve head.

Preferably, the parts of the centrifugally-operated valvular mechanism 13 are so initially adjusted that, with the engine idling, the spring 40 serves to move valve-actuating member 34 to the left in order to effect contact between member 43 and exhaust valve head 46 and lift the intake valve 45 off its seat. Under these conditions, fluid pressure will be conducted from conduit 17 to conduit 18, and, as heretofore described, the clutch motor will be energized in order to effect disengagement of the vehicle clutch. When engagement of the clutch is desired, the engine speed is increased and the valve-actuating member 34 will be moved to the right, as viewed in Fig. 1, through the action of the centrifugally-operable weights 31. Thus the intake valve head 45 will be closed by means of spring 49 and member 43 will be moved away from the exhaust valve head 46 in order to gradually connect conduit 18 with the atmospheric exhaust conduit 25. Thus the vehicle clutch may be smoothly engaged through the control of the engine speed.

The invention as disclosed in Fig. 1, in addition to embodying the structure heretofore described, which secures the highly desirable and advantageous results outlined, moreover, is constituted in such a manner that, regardless of the speed of the engine and the operation of valvular mechanism 13, disengagement of the vehicle clutch is assured during each change in gear. To this end, valvular mechanisms 19 and 21 are associated with the shift rails 10 and 11 respectively. As shown, the valvular mechanism 19 includes a casing 50 provided with inlet, outlet and exhaust chambers 51, 52 and 53 respectively, a valve 54 being housed within the casing and having an intake head 55 positioned within chamber 51 and an exhaust head 56 located within chamber 52. A valve-actuating member 57 is slidably mounted within the casing 50 and its upper portion is provided with a bore 58 functioning as an exhaust valve seat for head 56 and also serving to connect chamber 52 with chamber 53 and conduit 18 when the member 57 is moved out of contact with respect to head 56. The valve-actuating member 57 is operated by a suitable cam mechanism 58 carried by the shift rail 10, the cam mechanism being formed with a centrally-disposed cam groove 59, a pair of raised cam portions 60 and 61 disposed on either side thereof, and reduced portions 62 and 63 disposed adjacent cams 60 and 61. With such an arrangement and with the transmission in the neutral position illustrated, a ball 64 in contact with the lower end of valve-actuating member 57 will be received within the cam groove 59, and thus exhaust valve head 56 will be opened and conduits 20 and 18 will be connected through chamber 52, bore 58 and chamber 53. Thus, fluid pressure will be conducted from the conduit 18 leading from the valvular mechanism 13 to the conduit 20 associated with the valvular mechanism 21, and, since the latter is opened when the transmission is in neutral, fluid pressure will be conducted to the clutch motor 12 and the vehicle clutch will be disengaged with the engine idling. With the control mechanism in such condition, movement of the lever 7 to engage member 8 and shift the rail 10 in either direction from neutral position will through cams 60 or 61 serve to move member 57 upwardly, as viewed in Fig. 1, in order to close exhaust valve 56 and open intake valve 55. When the latter valve is opened, fluid pressure is conducted from the reservoir 14 to the clutch motor 12 by way of conduit 15, interconnected chambers 51 and 52, conduit 20, valvular mechanism 21, and conduits 22 and 24. After completion of gear-shifting movement of the rail 10, the cam portions 62 or 63 will be in contact with the ball 64 and the valvular mechanism 19 will be returned to the position shown on Fig. 1 where the centrifugally-controlled valvular mechanism 13 may control the clutch-engaging operation of the clutch motor 12. Thus, the valve mechanism 19 insures disengagement of the vehicle clutch prior to establishment of any gear relation controlled by shift rail 10 and irrespective of the centrifugally-controlled valvular mechanism 13.

The valvular mechanism 21 is similar in construction to the valvular mechanism 19 and includes a casing 65 forming intake, outlet and exhaust chambers 66, 67 and 68 respectively. A valve 69 having intake and exhaust heads 70 and 71 is normally resiliently urged as by means of spring 72 into the position shown wherein the intake valve 70 is closed and cuts off communication between conduits 15 and 22. The shift rail 11 is provided with a cam mechanism 73 similar to cam mechanism 58 associated with valve 19, and, when the shift rail 11 is in neutral or either extreme of its movement to right or left, ball 74 associated with valve-actuating member 75 will contact cam grooves 76, 77 or 78 respectively. During shifting movement of rail 11 in either direction from neutral position, ball 74 will be engaged by raised cams 79 or 81 to move valve-actuating member 75 to such position that communication between conduits 20 and 22 is cut off while the latter conduit is connected to conduit 15 communicating with reservoir 14. Thus, during gear-shifting movements of the shift rail 11, valve mechanism 21 will be effective to control the flow of fluid pressure to the clutch motor 12 by way of conduit 15. Hence, during shifting of the transmission gears, the vehicle clutch will be disengaged regardless of the speed of the engine and the operation of the centrifugally-controlled valvular mechanism 13.

In order to prevent the centrifugally-controlled valvular mechanism from supplying fluid pressure to the clutch motor when the vehicle transmission is operated to effect the establishment of certain gear ratios, means are provided for disconnecting the said valvular mechanism from the source of fluid pressure whenever a shift to such predetermined gear ratio is desired. Preferably, such means are so constituted that this disconnection of the source of fluid pressure from the valve mechanism is effected when shifting to second or third gear ratio. As shown, such means include the valvular mechanism 16 which comprises a casing 82 having a valve 83 therein which is constantly urged by spring 84 to a seat 85. In the position shown, the valve 83 has been moved off its seat by an actuating member 86 controlled by ball 87 in constant contact with the shift rail 10. Thus, conduit 15 is connected to conduit 17 by way of conduit 88 and open valve 83. When shift rail 10 is moved to either extreme position of its movement in order to establish second or third gear ratio, the ball 87 will be received in either of the cam grooves 62 or 63. Under such conditions, spring 84 associated with valve 83 will move the latter to its seat 85 and thus disconnect conduits 88 and 17. The supply of fluid pressure from reservoir 14 to the centrifugally-controlled valvular mechanism 13 will thus be effectively interrupted, and, when the second or third gear ratio is established, the centrifugally-controlled valvular mechanism will be ineffective to cause disengagement of the clutch motor.

While the valve mechanisms 19 and 21 heretofore described serve to control the clutch-disengaging movement of the clutch motor 12 under certain conditions, it will be readily perceived that the association of these valves with the centrifugally-controlled valve 13 is such that the latter controls the exhaust of fluid pressure from the motor 12 and thus the engagement of the vehicle clutch, irrespective of the gear ratio established by the transmission mechanism. This will be readily understood when it is considered that conduit 18, connected with the centrifugally-controlled valve, is always connected with conduit 22 associated with the clutch motor 12 whenever the valves 19 and 21 are in the position shown in Fig. 1 or in the position where the balls 64 and 74 respectively engage the reduced cam portions 62, 63 or 77, 78. Such reduced cam portions are engaged when the transmission is established in a gear ratio. Thus, although when second or third gear relation is established, the valves serve to control the disengagement of the vehicle clutch, still, after establishment of the second or third gear relation, the exhaust of fluid from the clutch motor will be controlled by the centrifugally-operable valve mechanism. Hence the latter efficiently controls engagement of the clutch irrespective of the gear ratio established by the transmission mechanism.

Referring more particularly to Fig. 2, the vehicle control mechanism illustrated therein is somewhat similar to that shown in Fig. 1 with the exception that the transmission mechanism is slightly different and the valves 19 and 21 of Fig. 1 have been combined into a single valve device. As shown in Fig. 2, the transmission mechanism 90 embodies three shift rails 91, 92 and 93 which are respectively operable to establish third or fourth gear relation, first or second gear relation or reverse gear relation. The construction also includes a clutch-controlling member 94 having a fluid motor 95 associated therewith, a centrifugally-operated valvular mechanism 96, controlled by engine 97, and a valvular mechanism 98 for controlling the application of fluid pressure to the clutch motor 95 during changes in the transmission ratio.

With the transmission in neutral position, fluid pressure is conducted from any suitable source to the centrifugally-controlled valve mechanism 96 by way of conduit 99, valvular mechanism 100 and conduit 101. This communication with the source of pressure is maintained at all times except when the shift rail 91 is moved to establish third or fourth gear relation, as will be more particularly pointed out hereinafter. Fluid pressure from the centrifugally-controlled valve mechanism 96 is conducted to the clutch motor 95 by way of conduit 102, valvular mechanism 98 and conduit 103, and, when the engine 97 is idling, the clutch-controlling member 94 is moved to clutch-disengaged position through the fluid pressure supplied by the centrifugally-controlled valve 96.

In order that fluid pressure may be conducted to the clutch motor 95 when any of the shift rails 91, 92 or 93 are operated, the transmission mechanism 90 is provided with means for operating valvular mechanism 98 in such a manner as to establish communication between conduit 103 and a pressure source (not shown) associated with conduit 104. As shown, such means include a plurality of shiftable elements 105, 106 and 107 which have cam-formed ends adapted to cooperate with balls 108, 109 and 110. Ball 110, in addition to cooperating with element 107, also cooperates with an element 111 which is fixedly mounted with respect to a casing 112 of the mechanism as by means of a pin 113. The ball 110 is furthermore associated with the shift rail 91, and, as will be more fully understood by reference to Fig. 3, when the shift rail 91 is in neutral position, ball 110 is received within a depression 114 provided in the shift rail. Similar depressions 115 and 116 are disposed on opposite sides of the depression 114 and are adapted to register with the ball 110 when the shift rail 91 is moved to establish third or fourth gear relation. Between the depressions above mentioned, the surface of the shift rail 91 constitutes a pair of cams 117 and 118 which are effective to move ball 110 upwardly, as viewed in Fig. 2, which causes movement of members 107, 106 and 105 to the right, whenever shift rail 91 is moved to establish third or fourth gear relation. Such movement of the ball 110 effects operation of valvular mechanism 98, as will appear more fully hereinafter.

Shift rail 92, like the shift rail 91, is provided with a similar cam mechanism for operating ball 109, in this case the shift rail being provided with depressions 119, 120 and 121, the surface of the shift rail 92 between such depressions forming cams 122 and 123 for moving ball 109 upwardly to effect movement of elements 106 and 105 to the right, as viewed in Fig. 1. The shift rail 93, movable in one direction only to establish reverse gear relation, is provided with a pair of depressions 124 and 125, as will be clear from Fig. 4, the surface of rail 93 between the depressions forming a cam 126 for moving ball 108 upwardly when reverse gear relation is being established in order to move element 105 to the right to operate valvular mechanism 98.

For the purpose of controlling the connection between conduits 103 and 104 during the above described movements of the shift rails, the valvular mechanism 98 more particularly includes a casing 127 forming inlet, outlet and exhaust chambers 128, 129 and 130 respectively, there being provided a valve 131 having an intake head 132 located within the intake chamber and an exhaust head 133 positioned within the outlet chamber. A valve-actuating element 134 is maintained in constant engagement with element 105 as by means of a spring 135, the element being formed with a bore 136 and having a plurality of ports 137 formed in the side wall thereof and serving to connect the outlet chamber 129 with the exhaust chamber 130 whenever the said element is moved away from exhaust valve 133. A spring 138 is associated with the valve 131 in such manner as to constantly tend to urge the same to such a position as to close the intake valve 132.

It will be understood from the foregoing that, with the tranmission in neutral position, wherein the balls 110, 109 and 108 are respectively received in recesses 114, 119 and 124, spring 135 will urge the valve-actuating member 134 to the left in order to establish communication between the outlet chamber 129 and exhaust chamber 130 and thus permitting spring 138 to close intake valve 132. Under these conditions, conduits 102 and 103 will be connected and the centrifugally-operable valve mechanism 96 will control the flow of fluid pressure to and from the clutch motor 95. However, in the event of movement of any of the shift rails 91, 92 or 93 to establish a desired gear relation, one or the other of the balls 108, 109 or 110 will be cammed upwardly, as viewed in Fig. 2, in order to move the valve-actuating member 134 to the right through shifting of element 105. This will close the exhaust valve 133 and open the intake valve 132, thus connecting the clutch cylinder 95 with the fluid pressure source by way of conduits 103 and 104 and independently of the centrifugally-controlled valve mechanism 96. After the gear relation has been established, however, conduits 102 and 103 are again connected in the manner previously set forth.

Means are provided for preventing movement of more than one of the shift rails at a time, and preferably such means are utilized for disconnecting the centrifugally-controlled valvular mechanism from the source of fluid pressure supplied whenever the shift rail controlling the establishment of third and fourth gear relation is moved to a ratio-changing position. As shown, such means include a locking pin 140 which may engage either of the recesses 141 or 142 positioned in the sides of rails 91 or 92. The arrangement is such, see Fig. 3, that, when rail 92 is moved, the pin 140 will be moved into locking engagement with recess 141 of rail 91. When rail 92 returns to neutral position, however, and recess 142 becomes aligned with the pin 140, rail 91 may be moved and, in this case, pin 140 will be shifted to engage recess 142. The central portion of the pin 140 is formed as a cam 143 which is constituted in such a manner that, when shift rail 91 is moved in either direction, the cam 143 will move valve-operating member 144 of valve 100 upwardly, as viewed in Fig. 2. However, the cam 143 will have no effect on member 144 when shift rail 92 is moved. Thus, when third or fourth gear relation is being established, valve 100 is operated in such a manner as to interrupt communication between the centrifugally-controlled valve 96 and the source of pressure.

More particularly, the valve 100 includes a casing 145 having an inlet chamber 146 and an outlet chamber 147 formed therein, the latter chamber slidably receiving a valve-operating member 144, the upper portion of which carries a valve 148 secured to a stem 149 receivable in a bore 150 of the member 144. The valve 148 is maintained in the position shown as by means of a spring 151 which is fully extended, the valve 148 being open and thus connecting conduits 99 and 101. However, when member 144 is cammed upwardly in the manner heretofore described, valve 148 engages a seat 152 and the construction is such that the compression of spring 151 will be increased to such a degree as to prevent the pressure in conduit 99 from opening the valve 148 and passing to conduit 101. Under these conditions, the supply of fluid pressure to the centrifugal valve 96 will be cut off and the latter will therefore not be effective to supply fluid pressure to the clutch motor when the transmission is operated to establish third or fourth gear relation.

While the valve 98 is operative to control the flow of fluid pressure from the clutch motor 95 during shifting movement of the transmission shift rails, it will be understood that the centrifugally-operated valve 96 will control the exhaust of fluid from the clutch motor 95 at all times. This will be clearly understood when it is pointed out that conduit 103 from the clutch motor is always connected to conduit 102 leading to the centrifugal valve whenever the transmission is established in any of its gear ratios or is moved to neutral position. Thus, the engagement of the vehicle clutch may be smoothly and efficiently regulated by increasing the engine speed irrespective of the gear relation established by the transmission.

It will be understood from Fig. 2 that the parts are disclosed in the position they occupy when shift rod 92 is initially moved to establish the second gear relation. Under these conditions, valve 98 has been operated by shifting movement of elements 106 and 105, in order to supply fluid pressure to the clutch motor 95 by way of conduits 104 and 103. The clutch-controlling member 94 is therefore moved to clutch-disengaged position and further movement of shift rail 92 may be effected, through any suitable means, in order to establish the second gear ratio. When second gear is established, ball 109 registers with cam depression 120, and elements 106 and 105 will be shifted to the left under the action of spring 135 associated with valve 98. Valve-actuating member 134 will also be moved to the left, thus opening exhaust valve 103 and connecting the clutch motor 95 with a centrifugally-controlled valve mechanism 96 through conduits 103 and 102. Intake valve 132 will be closed by the action of spring 138. Increased speed of the engine 97 will operate valvular mechanism 96 in such a manner that the clutch motor 95 will be gradually exhausted and the vehicle clutch thus returned in a smooth and efficient manner.

When it is desired to shift into first gear relation, shift rail 92 is moved in the opposite direction from that heretofore described and the cycle of events is precisely the same as that outlined in connection with the shift to second.

With all of the shift rails 91, 92 and 93 in normal neutral position, movement of rail 91 in either direction to establish third or fourth gear relation will effect energization of the clutch motor 95 through operation of the valve 98 in the manner heretofore specifically set forth.

Simultaneously with the movement of rail 91, however, the interlocking element 143 will be cammed out of engagement with respect to the notch 141 of shift rail 91 and will be moved into engagement with notch 142 of shift rail 92. Cam 143 formed on element 140 will thereupon move the valve-actuating member 144 upwardly in order to close off communication between conduits 99 and 101. Thus the supply of fluid pressure to the centrifugally-controlled valvular mechanism 96 will be interrupted whenever the shift rail 91 is moved to establish third or fourth gear relation. Engagement of the vehicle clutch after establishment of the gear ratios controlled by shift rail 91 will be effected in the same manner as heretofore described in connection with the shift to second gear, it being understood that valve 98 will be returned to such position as to connect conduits 103 and 102 as soon as third or fourth gear relation is established and ball 110 registers with either of the depressions 115 or 116 formed on rail 91.

While two embodiments of the invention have been disclosed herein and have been described with considerable particularity, it is to be understood that the invention is not limited thereto. As well understood by those skilled in the art, various changes may be resorted to without departing from the spirit of the invention. Reference will, therefore, be had to the appended claims for a definition of the limits of the invention.

What is claimed is:

1. In combination with an automotive vehicle engine, a gear-changing mechanism including a plurality of elements movable to establish different gear ratios, a clutch-controlling member, means including a fluid motor for controlling the clutch-disengaging and engaging movements of said member, valve means operable by movement of said elements for controlling the energization of said motor, other valve means controlled by the speed of said engine for effecting energization of said motor, and means for rendering the last named valve means inoperative to energize the fluid motor, irrespective of engine speed, said last named means including a valve operable by movement of one of said elements.

2. In combination with an automotive vehicle engine, a gear-changing mechanism including a pair of shiftable elements, a clutch-actuating member, means including a fluid motor for controlling the movements of said member, means for varying the fluid pressure in said motor in order to effect and control the clutch-disengaging and engaging movements of said member, said means including a pair of valves, one operated by movement of one of said elements, and the other controlled by the speed of the engine, means including a valve operated by said one element for connecting said speed-controlled valve with a pressure source, and means for interconnecting said pair of valves in such manner that the fluid pressure in said motor is exhausted from the speed-responsive valve by way of the element-operated valve to control the clutch-engaging movement of said member after establishment of the gear ratio determined by movement of said element.

3. In combination with an automotive vehicle engine, a gear-changing mechanism including a plurality of shiftable elements, a clutch-actuating member, means including a fluid motor for controlling the movements of said member, means for varying the fluid pressure in said motor in order to effect and control the clutch-disengaging and engaging movements of said member, said means including a pair of valves, means associated with the engine for operating one of the valves in accordance with variations in engine speed, means including a valve device operated by movement of one of said elements for controlling the communication between said speed-operated valve and a pressure source, means controlled by movement of any of said elements for operating the other of said pair of valves to supply fluid pressure to said motor independently of said one valve, and means for interconnecting said valves in such manner that the fluid pressure from said motor will be exhausted through said one valve by way of said other valve.

4. In combination with an automotive vehicle engine, a gear-changing mechanism including a plurality of shiftable elements, a clutch-actuating member, means including a fluid motor for controlling the movements of said member, means including a centrifugally-controlled valve means for controlling the flow of fluid pressure to and from the motor, valve means actuated by movement of the elements for controlling the flow of fluid pressure to and from the motor, and means operated by movement of one of said elements for rendering the centrifugally-controlled valve means inoperative to control the flow of fluid pressure to the motor when said one element is moved to a predetermined position.

5. In combination with an automotive vehicle engine, a gear-changing mechanism including a plurality of shiftable elements, a clutch-actuating member, means including a fluid motor for controlling the movements of said member, means including a centrifugally-controlled valve means for connecting said motor with a source of fluid pressure, valve means actuated by movement of said elements for connecting the motor with the source, and means actuated by the movement of one of the elements to a predetermined position for disconnecting the centrifugally-controlled valve means from said source.

6. In combination with an automotive vehicle engine, a gear-changing mechanism including a plurality of shiftable elements, a clutch-actuating member, means including a fluid motor for controlling the movement of said member, means including a centrifugally-controlled valve means for connecting said motor with a source of fluid pressure, valve means actuated by movement of said elements for connecting the motor with the source, and a valve device actuated by the movement of one of the elements to a predetermined position for disconnecting the centrifugally-controlled valve means from said source.

7. In combination with an automotive vehicle engine, a gear-changing mechanism including a plurality of shiftable elements, a clutch-actuating member, means including a fluid motor for controlling the movement of said member, valve means operable by movement of said elements in effecting all changes of gear to supply fluid pressure to said motor to cause clutch-disengaging movement of said member, other valve means responsive to the speed of the engine for supplying fluid pressure to the motor, and means operated by one of said elements during movement thereof in either of opposite directions to effect predetermined changes of gear for rendering the last named valve means inoperative to supply fluid pressure to the motor, said last named means including a valve device operated by said one element.

8. In combination with an automotive vehicle engine, a gear-changing mechanism including a plurality of shiftable elements having a locking pin associated therewith, a clutch-actuating member, means including a fluid motor for controlling the movements of said member, means for varying the fluid pressure in said motor in order to effect and control the clutch-disengaging and engaging movements of said member, said means including a centrifugally-controlled valve means, a source of fluid under pressure, a valve device for connecting said source and valve means, and means connecting said pin and valve device for operating the latter to interrupt communication between the source and valve means when one of the elements is moved to a predetermined position.

9. In combination with an automotive vehicle engine, a gear-changing mechanism including a plurality of shiftable elements having a locking pin associated therewith, a clutch-actuating member, means including a fluid motor for controlling the movements of said member, means for varying the fluid pressure in said motor in order to effect and control the clutch-disengaging and engaging movements of said member, said means including a centrifugally-controlled valve means, a source of fluid under pressure, a valve device for connecting said source and valve means, other valve means controlled by movement of said elements in effecting all gear changes to connect said motor and source, and means connecting said pin and valve device for operating said valve device to interrupt communication between the source and centrifugally-controlled valve means when one of the elements is moved to a predetermined position.

10. In combination with an automotive vehicle engine, a gear-changing mechanism including a plurality of elements movable to selectively establish one of a plurality of gear ratios, said elements having a locking pin associated therewith, a clutch-controlling member, means including a fluid motor for controlling the clutch-disengaging and engaging movements of said member, valve means operable in accordance with variations in the speed of said engine, means connecting said valve means and source, and means associated with said locking pin for rendering said last named connecting means inoperative to connect the valve means and source when one of said elements is moved to establish a predetermined gear ratio.

11. In an automotive vehicle having an engine, a clutch-controlling member, and a transmission of the type having a plurality of shift rails shiftable to establish a desired gear relation, a fluid motor for controlling disengaging and engaging movements of said clutch member, valve means responsive to the speed of the engine for controlling the flow of fluid to and from said motor, valve devices respectively operable by shifting movements of said rails for controlling the flow of fluid to and from said motor, valve mechanism operated by one of the rails during shifting movement thereof for controlling the communication between the speed-responsive valve means and a fluid pressure source, and means for connecting said valve means and valve devices whereby fluid from said motor is conducted to said valve means through said valve devices.

12. In combination with an automotive vehicle engine, a gear-changing mechanism including a plurality of shiftable elements, a clutch-actuating member, means including a fluid motor for controlling the movements of said member, means for varying the fluid pressure in said motor in order to effect and control the clutch-disengaging and engaging movements of said member, said means including a pair of valves, one of said valves being operated in accordance with the speed of the engine and the other of said valves being operated by shiftable movements of said elements, a valve mechanism adapted to be connected with said one valve, a source of fluid pressure, means connecting said other valve and the source, means connecting said source and valve mechanism, and a locking pin associated with said elements and movable by one of said elements during shifting movement thereof for controlling said valve mechanism.

13. In combination with an automotive vehicle engine, a gear-changing mechanism including a plurality of elements movable to selectively establish a desired gear ratio, a locking pin associated with said elements, a clutch-controlling member, means including a fluid motor for controlling the clutch-disengaging and engaging movements of said member, valve means operable in accordance with variations in the speed of said engine, means connecting said valve means with said motor, a source of fluid pressure, valve mechanism for connecting said valve means and source, and cam means carried by said pin for controlling said valve mechanism to interrupt communication between the valve means and source when one of the elements is moved to establish a predetermined gear ratio.

14. In combination with an automotive vehicle engine, a gear-changing transmission including a plurality of shift rails for effecting desired changes in gear, means associated with said rails to prevent movement of one rail during movement of another, a clutch-operating member, means including a fluid motor for controlling the movements of said member, and means for automatically controlling the energization of said motor, said last named means including a valve and a device operated by movement of said first named means during operation of one shift rail with respect to another.

15. In combination with an automotive vehicle engine, a gear-changing transmission including a plurality of shift rails for effecting desired changes in gear, means associated with said rails to prevent movement of one rail during movement of another, a clutch-operating member, means including a fluid motor for controlling the movements of said member, a fluid supply, a valve for automatically controlling the energization of said motor, and valve means operated by movement of said first named means during operation of one shift rail with respect to another for controlling the communication between said valve and supply.

ROY S. SANFORD.
WILLIAM J. ANDRES.